(12) United States Patent
Parunashvili et al.

(10) Patent No.: US 10,791,076 B1
(45) Date of Patent: Sep. 29, 2020

(54) ENTITY DETECTION IN MESSAGES

(71) Applicant: Facebook, Inc., Menlo Park, CA (US)

(72) Inventors: Stepan Parunashvili, San Francisco, CA (US); Kemal El Moujahid, Mountain View, CA (US); Laurent Nicolas Landowski, Emerald Hills, CA (US)

(73) Assignee: Facebook, Inc., Menlo Park, CA (US)

( * ) Notice: Subject to any disclaimer, the term of this patent is extended or adjusted under 35 U.S.C. 154(b) by 202 days.

(21) Appl. No.: 15/879,368

(22) Filed: Jan. 24, 2018

(51) Int. Cl.
| | |
|---|---|
| *H04L 12/58* | (2006.01) |
| *G06F 40/35* | (2020.01) |
| *G06F 40/211* | (2020.01) |
| *G06F 40/284* | (2020.01) |

(52) U.S. Cl.
CPC .......... *H04L 51/063* (2013.01); *G06F 40/211* (2020.01); *G06F 40/284* (2020.01); *G06F 40/35* (2020.01); *H04L 51/02* (2013.01); *H04L 51/18* (2013.01)

(58) Field of Classification Search
CPC ....... H04L 51/063; H04L 51/02; H04L 51/18; G06F 17/271; G06F 17/277; G06F 17/279
See application file for complete search history.

(56) References Cited

U.S. PATENT DOCUMENTS

2018/0232356 A1\* 8/2018 Gonzalo Vaca ...... G06F 17/278
2019/0089668 A1\* 3/2019 DeLuca ................. H04L 51/26

OTHER PUBLICATIONS

Bashmakov, P., "Advanced Natural Language Processing Tools for Bot Makers—Luis, Wit.ai, Api.ai and others (Updated)," Dec. 22, 2016, 26 pages, [online] [retrieved Mar. 19, 2018], Retrieved from the internet <https://stanfy.com/blog/advanced-natural-language-processing-tools-for-bot-makers/>.
McClendon, B., "Getting started with conversational bots using Wit.ai," May 23, 2016, 13 pages, [online] [retrieved Mar. 19, 2018], [Retrieved from the internet <https://knightlab.northwestern.edu/2016/05/23/getting-started-with-conversational-bots-using-wit-ai/>.

\* cited by examiner

*Primary Examiner* — El Hadji M Sall
(74) *Attorney, Agent, or Firm* — Fenwick & West LLP

(57) ABSTRACT

A messaging server that concurrently provides a business or other recipient with a message sent to the recipient and the set of entities detected within the message using natural language processing (NLP). A business interacts with the messaging server to specify the types of NLP to perform on messages received by the business. The messaging server creates a configuration token describing the specified NLP configuration. The messaging server receives a message sent from a client to the business and generates a payload describing the message and including the configuration token. The messaging server then sends the payload to a NLP server. The NLP server performs NLP on the message in the payload according to the configuration specified by the token to detect a set of entities. The messaging server forms an enriched payload including the message and detected entities and forwards the enriched payload to the business.

17 Claims, 6 Drawing Sheets

US 10,791,076 B1

ENTITY DETECTION IN MESSAGES

BACKGROUND

This disclosure relates generally to electronic messaging, and more particularly to detecting entities within messages exchanged using a messaging system.

Use of dedicated messaging applications for commercial transactions is becoming more commonplace. For example, a customer of an online business might use such a messaging application to send an inquiry about a product to a business. Businesses, in addition, may wish to use such applications to communicate directly with their customers and potential customers.

Dedicated messaging applications provide a rich feature set that may not be available using conventional email or other messaging technologies. Both the sender and receiver of the messages can be authenticated and delivery of the messages can be verified. In addition, the messages can include certain formatting and/or content features that are not supported by other messaging technologies.

A business may desire to perform processing on messages received from customers via the dedicated messaging application. The processing can generate information about the messages to assist with tasks such as routing, categorizing, and automatically responding to the messages. The processing requires one or more application programming interface (API) calls to be made after the message is received. These calls add latency and complexity to the message receipt workflow. As a result, the business's ability to process messages in order to perform the tasks is negatively impacted.

SUMMARY

The above and other issues are addressed by a messaging server that concurrently provides a business or other recipient with a message sent to the recipient and the set of entities detected within the message using natural language processing (NLP). The business registers a bot to receive messages sent to pages of an online system associated with the business. The business also interacts with the messaging server to specify the types of NLP to perform on messages received by the specified business page/bot combination. The messaging server creates a configuration token describing the specified NLP configuration.

The messaging server receives a message sent from a client to the business. The generates a payload describing the message and including the configuration token. The messaging server then sends the payload to a NLP server. The NLP server receives the payload and parses the configuration token. The NLP server performs NLP on the message in the payload according to the configuration specified by the token to detect a set of zero or more entities and associated metadata. The NLP server sends a response to the payload to the messaging server. The response includes the set of detected entities and associated metadata.

The messaging server forms an enriched payload including the message, detected entities, and metadata and forwards the enriched payload to the business. The business generates a response to the client message. For example, the business may process the enriched payload using the messaging bot to produce the response. The business sends a response payload including the response to the messaging server. The messaging server forms a response message from the response payload and forwards the response message to the client.

The figures depict various embodiments of the present invention for the purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
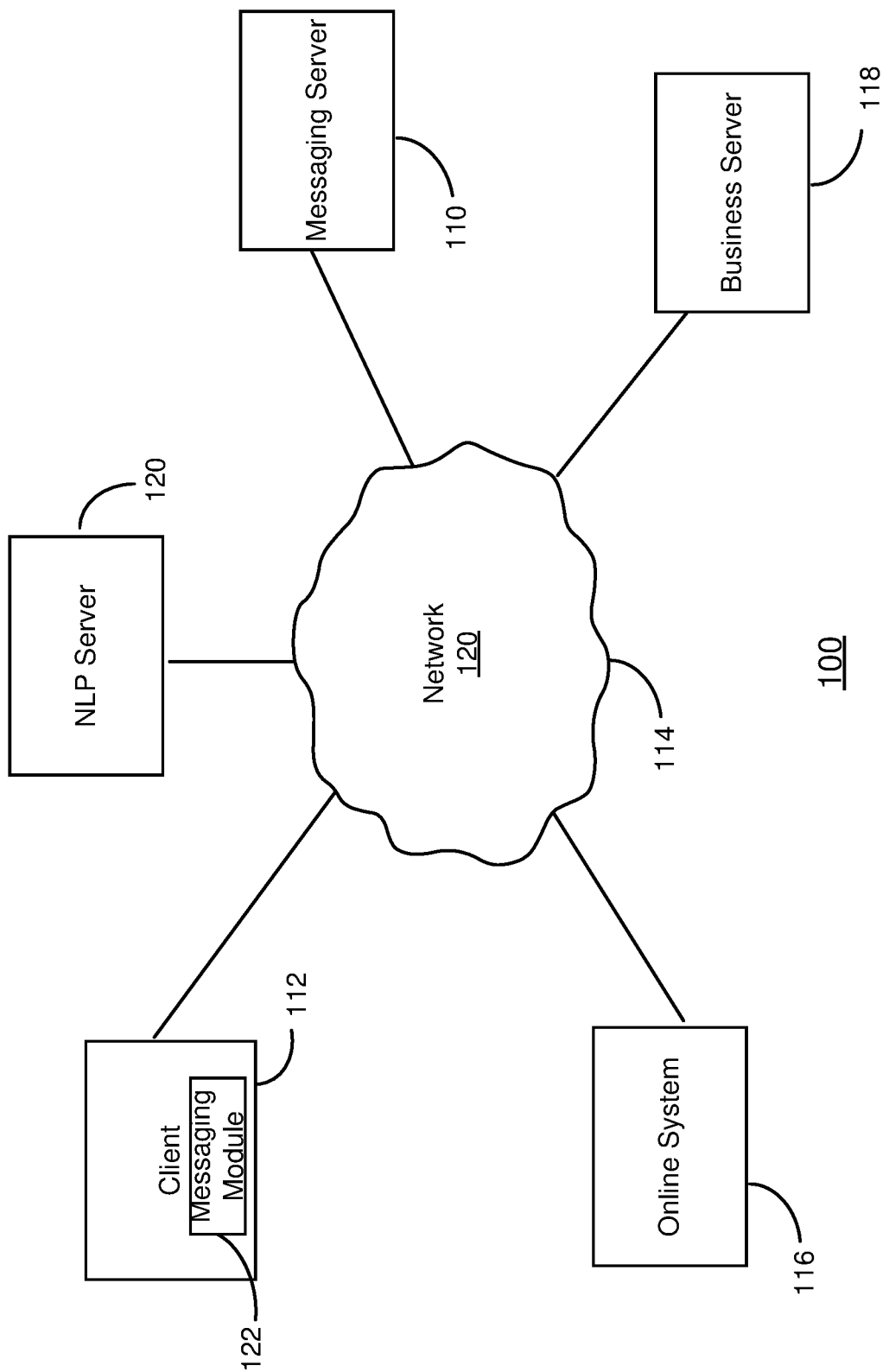
FIG. 1 is a high-level block diagram illustrating a system environment including an electronic messaging server.

FIG. 1 is a high-level block diagram illustrating a system environment 100 including an electronic messaging server 110. The environment 100 also includes a client 112 connected to the messaging server 110 via a network 114. An online system 116, business server 118, and natural language processing (NLP) server 120 are also connected to the network 114. While FIG. 1 shows only a single client 112 and business server 118, embodiments of the environment 100 may have many such clients and business servers connected to the network 114. There may likewise be multiple messaging servers 110, online systems 116, and NLP servers 120 connected to the network 114. Other components may also be connected to the network 114.

A client 112 is a computing device that can transmit and/or receive data via the network 114. A user may use the client 112 device to perform functions such as exchanging messages using the messaging server 110, interacting with the online system 116, browsing websites on web servers on the network 114, consuming digital content received via the network, and executing software applications. For example, the client 112 may be a smartphone or a tablet, notebook, or desktop computer. In addition, the client 112 may be an Internet-of-Things (IoT)-connected device such as a home appliance. The client 112 may include a display device on which the user may view digital content, such as messages exchanged using the messaging server 110.

The client 112 may execute one or more applications ("apps") that extend the functionality of the client. The apps may include a web browser that allows the client device 112 to interact with websites provided by servers connected to the network 114. The apps may also include one or more dedicated apps for accessing the online system 116 and/or the messaging server 110. In one embodiment, the user downloads and installs apps on the client 112 for specific purposes, such as exchanging messages using the messaging server 110. Alternatively, the functionality of an app may be incorporated into an operating system of the client 112 or included in native functionality of the client.

The messaging module 122 illustrated within the client 112 in FIG. 1 represents an app for interacting with the messaging server 110 via the network 114. The messaging module 122 enables a user of the client 112 to exchange messages with users of other clients and with businesses operating business servers 118. In one embodiment, the messaging module 122 exchanges such messages with the messaging server 110.

The online system 116 supports interactions among users of the clients 112 and businesses. These interactions may include exchanging and viewing content, ecommerce transactions, and messaging. The content provided by the online system 116 includes business pages associated with businesses. A page provides information about a business and may support other interactions such as allowing users to share information with the business.

In one embodiment, a business page includes a communication link with which a user can interact to initiate a message exchange with the associated business via the messaging server 110. The functionality may take the form of a code such as a clickable object or scannable image that contains a reference to the enterprise's presence in the messaging server 110. When a user interacts with the communication link, the online system 116 interacts with the messaging module 122 of the user's client device to exchange messaging information, such as identifiers of the user and business, allowing the user and business to exchange messages using the messaging server 110.

In a further embodiment, the communication link may be located on the network 114 at a location outside of the online system 116. For example, the business may place the communication link on a website hosted by a web server connected to the network 114. In this example, a user of a client 110 can browse the website and interact with the communication link to exchange messages without having visited the online system 116.

The NLP server 120 performs NLP on messages sent from users of clients 112 to businesses operating business servers 118. In one embodiment, the NLP server 120 uses NLP to identify entities in the messages. The entities represent meanings and intents conveyed by the messages. The types of NLP performed by the NLP server 120 can vary. For example, the NLP server 120 can detect different sets of entities for different messages. The NLP server 120 outputs the entities associated with respective messages.

The messaging server 110 interacts with the messaging modules 122 of the clients 112 and with the business servers 118 to support the exchange of electronic messages among users and businesses. A given message includes message content, an identifier (ID) of the sender that sent the message (e.g., the user of the client 112) and an ID of the recipient of the message. The recipient ID may be an ID of a business page to which the message was directed. The message may also include a thread ID identifying the message thread (also referred to as the "context") to which the message belongs.

In one embodiment, the messaging server 110 interacts with the businesses to determine the types of NLP processing that the businesses desire to have performed on messages sent to the business' respective business pages. The messaging server 110 receives messages from identified clients 112 directed to identified businesses pages and sends the messages to the NLP server 120 for processing. The messaging server 110 also tells the NLP server 120 the types of processing to perform on the messages. The messaging server 110 receives detected entities from the NLP server 120. Then, the messaging server 110 sends the messages and the detected entities to the businesses' respective business servers 118. This way, the businesses receive messages and the entities within the messages at the same time.

The business server 118 is operated by a business and used to exchange messages with users of clients 112 using the messaging server 110. The business is typically a for-profit organization that uses the business server 118 to communicate with its customers. However, the business can also be another type of organization such as a non-profit organization, an educational organization, or a government organization. All of these types of organizations are considered "businesses" for purposes of this description. Moreover, a business is merely one example of a message recipient within the environment of FIG. 1. The techniques described herein can be used to support recipients other than businesses with business servers.

In addition, the business server 118 may be implemented using one or more dedicated computers and/or a cloud computing platform. The business server 118 may be dedicated to supporting messaging with clients 112, may provide additional services, or may be integrated into a platform that also provides other services. The business server 118 may be operated and/or maintained by an administrator who is associated with the business.

The business server 118 communicates with the messaging server 110 to specify the types of NLP to be performed on messages from clients 112 that the messaging server 110 sends to the business server 118. In addition, the business server 118 concurrently receives client messages and the associated entities detected in the messages using the specified types of NLP. In one embodiment, the business server 118 processes the messages and associated entities using a messaging bot. The messaging bot is a software module (i.e., a program) that sends automated messages on behalf of the business. The messaging bot receives a message from a client 112 along with any associated entities and programmatically generates and sends a response to the message based on the content of the message, the entities detected within the message, and/or other information. For example, if a message contains a "bye" entity indicating a user's intent to terminate a conversation with the business, the messaging bot may generate response message that says "please don't go" or "so long." The messaging bot may also forward the message to an individual associated with the enterprise for further consideration.

Since the business server 118 receives a message and its associated entities at the same time, the business server 118 does not need to make further API calls or perform additional processing to obtain the entities for the messages. As a result, the business server 118 is able to process messages more efficiently, and process more messages concurrently, than if it were required to perform NLP after it received the messages. In addition, the business server 118 is able to specify the types of NLP to perform on received messages, which allows for more sophisticated and customized processing to be performed by the messaging bot than if this were not the case.

The network 114 exchanges information among clients, servers, and systems connected to it. In one embodiment, the network 114 uses standard communications technologies and/or protocols. Examples of networking protocols used for communicating via the network 115 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 114 may be represented using any suitable format, such as hypertext markup language (HTML) or extensible markup language (XML). In some embodiments, all or some of the communication links of the network 114 may be encrypted using any suitable technique or techniques.

Figure 2:
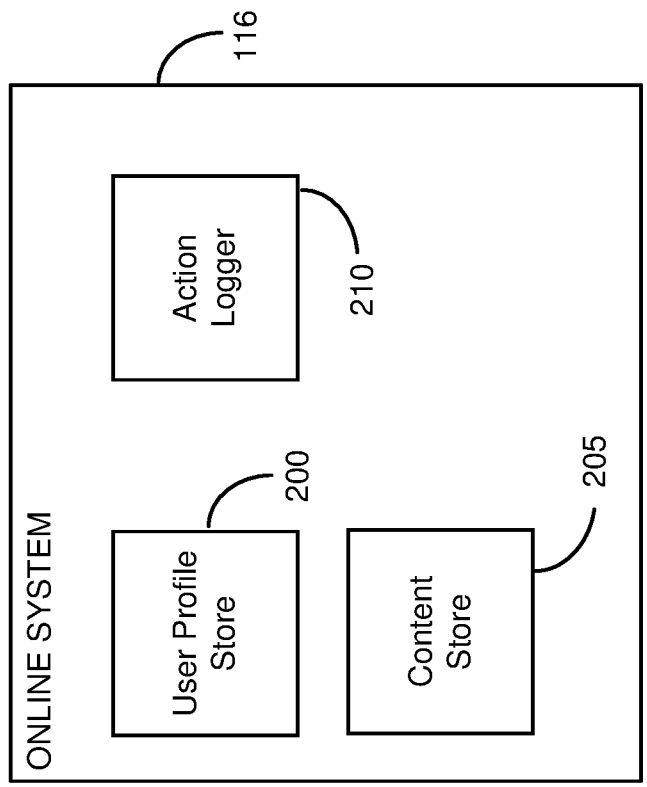
FIG. 2 is a block diagram of an architecture of the online system according to one embodiment.

FIG. 2 is a block diagram of an architecture of the online system 116 according to one embodiment. The online system 116 shown in FIG. 2 includes a user profile store 200, a content store 205, and an action logger module 210. In other embodiments, the online system 116 may include additional, fewer, or different components. Conventional components such as network interfaces, security functions, load balancers, failover servers, management and network operations consoles, and the like are not shown so as to not obscure the details of the system architecture.

Each user of the online system 116 is associated with a user profile, which is stored in the user profile store 200. A user profile includes declarative information about the user that was explicitly shared by the user and may also include profile information inferred by the online system 116. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 200 may also maintain references to actions by the corresponding user performed on content items in the content store 205 and stored in the action logger module 210.

While user profiles in the user profile store 200 are frequently associated with individuals, user profiles may also be stored for businesses. These profiles for businesses are the "business pages" referenced above. The business pages allow businesses to establish presences on the online system 116 for connecting and exchanging content with other online system users. A business may post information about itself to users of the online system 116 using one or more business pages. Other users of the online system 116 may connect to a business page to receive the information. As mentioned above, the business page may include a communication link with which a user can initiate a message exchange with the associated business via the messaging server 110.

The content store 205 stores objects that each represent various types of content. Examples of content represented by an object include a page post, a status update, a photograph, a video, a link, a shared content item, a gaming application achievement, a check-in event at a local business, or any other type of content. Online system users may create objects stored by the content store 205, such as status updates, photos tagged by users to be associated with other objects in the online system 116, events, groups or applications. In some embodiments, objects are received from third-party applications separate from the online system 116. In one embodiment, objects in the content store 205 represent single pieces of content, or content "items." Hence, online system users are encouraged to communicate with each other by posting text and content items of various types of media to the online system 116 through various communication channels. This increases the amount of interaction of users with each other and increases the frequency with which users interact within the online system 116.

The action logger module 210 receives communications about user actions internal to and/or external to the online system 116, populating an action log with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log.

Figure 3:
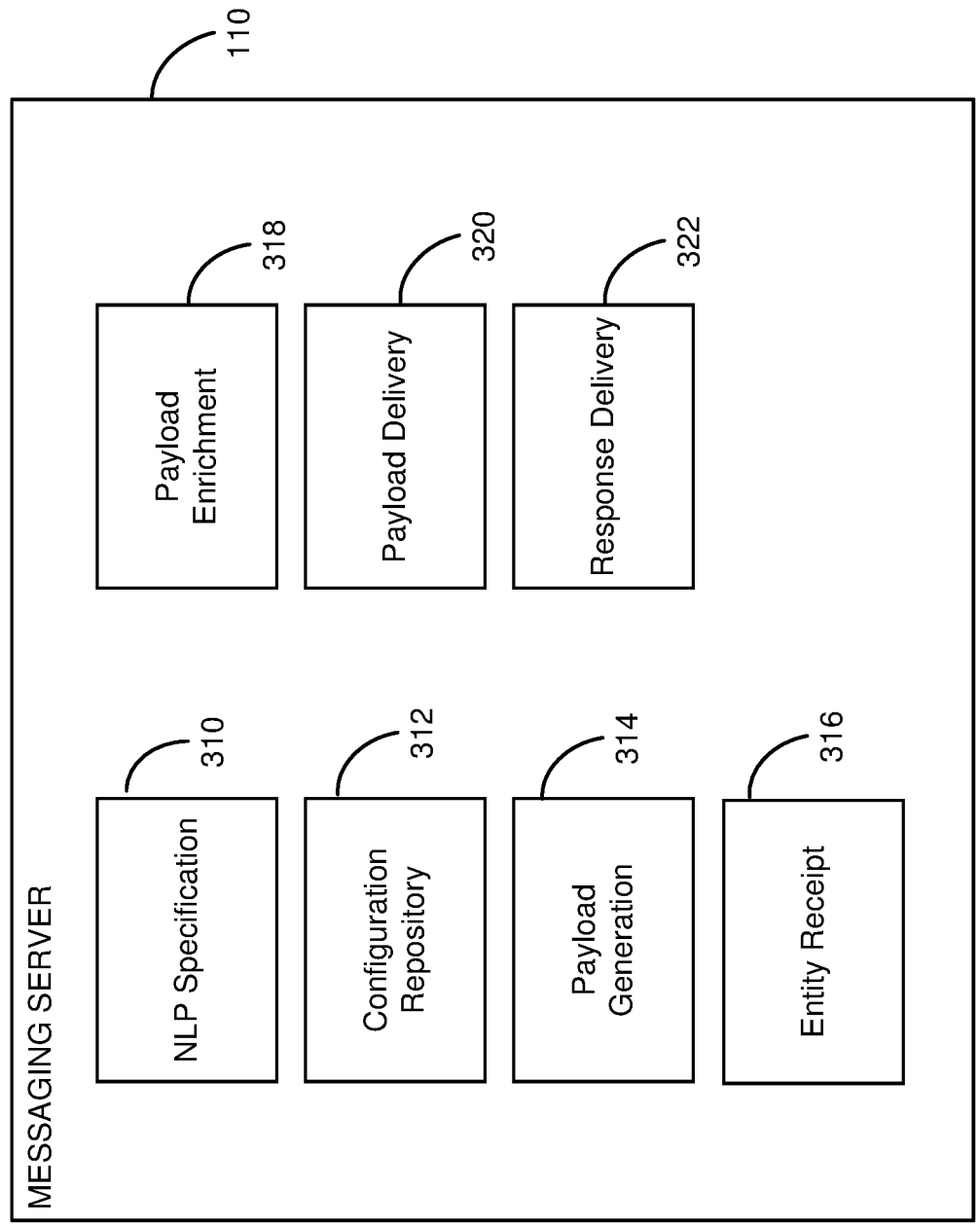
FIG. 3 is a block diagram illustrating a more detailed view of the messaging server according to one embodiment.

FIG. 3 is a block diagram illustrating a more detailed view of the messaging server 110 according to one embodiment. The messaging server 110 shown in FIG. 3 includes multiple modules. In other embodiments, the messaging server 110 may include additional, fewer, or different modules. In addition, the functionality attributed to specific modules herein may be performed by other modules in other embodiments.

An NLP specification module 310 enables businesses to specify the types of NLP processing to perform on messages sent to the businesses. In one embodiment, the NLP specification module 310 provides an API accessible by a business server 118 via the network 114. The API allows a business (e.g., an administrator associated with a business) to register a specific messaging bot to process messages received by a specific business page of the business. That is, through the API the NLP specification module 310 allows a business to register a specific messaging bot to process messages sent to the business using the communication link on a specific business page. The NLP specification module 310 allows a business to register different messaging bots for different pages.

In addition, the API provided by the NLP specification module 310 allows a business to specify the types of NLP to perform on messages received by specific business page/bot combinations. In one embodiment, the NLP specification module 310 enables a minimum set of NLP by default. Via the API, a business can instruct the NLP specification module 310 to disable NLP for a given page/bot combination (i.e., to opt out of NLP), to use the default NLP, or apply additional or different NLP to the page/bot combination beyond the default processing. For example, the NLP specification module 310 may provide a menu of NLP options to a business, and allow the business to select NLP options from the menu to perform on specific page/bot combinations. Further, in one embodiment the NLP specification module 310 allows a business to specify custom NLP to perform on messages received by specific page/bot combinations. The business can provide a hook to a function on the business server 118 or elsewhere on the network 114 that performs the custom NLP. The types of NLP specified for a particular page and bot is referred to as the "configuration" for that page/bot combination.

In one embodiment, the NLP specification module 310 creates configuration tokens describing page/bot configurations specified by businesses. A token is a set of bits that indicate a NLP configuration. For example, the set of bits in a token can indicate to use a default configuration, to use a particular combination different from the default, to perform custom processing using a hook to a function, or to opt out of NLP altogether.

A configuration repository 312 stores the configurations specified using the NLP specification module 310. The configuration repository 312 stores the business page/messaging bot combinations specified by businesses for particular pages. In addition, the configuration repository 312 stores the configuration tokens generated by the NLP specification module 310. The configuration repository 312 stores each configuration token in association with the page/bot combination to which it pertains.

In one embodiment, the configuration repository 312 is implemented as one or more databases that allow the configuration for a given business page to be determined. For example, the configuration repository 312 can be implemented as a database using business page IDs as keys and storing bot IDs and configuration tokens as values. This technique allows the bot and configuration token for given the business page to be quickly retrieved from the repository 312.

A payload generation module 312 generates message payloads describing messages sent by client users to businesses. When the messaging server 110 receives a message from a client 112 directed to a business, the messaging server forwards the message to the payload generation module 314. The payload generation module 314 generates a payload that describes the message.

In one embodiment, the payload generation module 314 generates the payload by normalizing the content of the message into a canonical format. The normalization may include removing non-alphanumeric characters and/or diacritical marks, for example. The payload generation module 314 also includes the sender ID, recipient (business page) ID, and thread ID in the payload. Further, the payload generation module 314 accesses the configuration repository 312 to determine the configuration token associated with identified business page ID and includes the configuration token in the payload.

An entity receipt module 316 receives entities for message payloads from the NLP server 120. In one embodiment, the entity receipt module 316 sends a payload from the payload generation module 314 to the NLP server 120 via the network 114. The payload includes the configuration token for the message. The entity receipt module 316 receives a response from the NLP server 120 containing a set of zero or more entities found in the message content of the payload after the NLP server performs the NLP specified by the token.

A payload enrichment module 318 forms enriched payloads incorporating responses from the NLP server 120. For a given message and response, the payload enrichment module 318 identifies the set of zero or more entities in the response received from the NLP server 120, and incorporates these entities into the message payload generated by the payload generation module 314 to produce an enriched payload. As a result, both the description of the message received from a client 112 and the entities detected using the NLP configuration specified by the message recipient (i.e., the business) are incorporated into the enriched payload.

A payload delivery module 320 sends enriched payloads to the message recipients. That is, the payload delivery module 320 forwards the enriched payloads to the businesses to which they were directed. In one embodiment, the payload delivery module 320 receives an enriched payload from the payload enrichment module 318 and sends it to the messaging bot registered to process messages sent to the business using the communication link on the specific business page. The messaging bot may reside on the business's business server 118.

A response delivery module 322 forwards response messages from bots to clients 112. A bot to which an enriched payload is delivered generates a response payload. The response delivery module 322 receives the response payload from the bot and identifies the user and client 112 to which the response is directed (e.g., using an identifier in the response payload). The response delivery module 322 then sends the response payload to the user's client as a response message. The response delivery module 322 may process the response payload to transform it into the response message.

Figure 4:
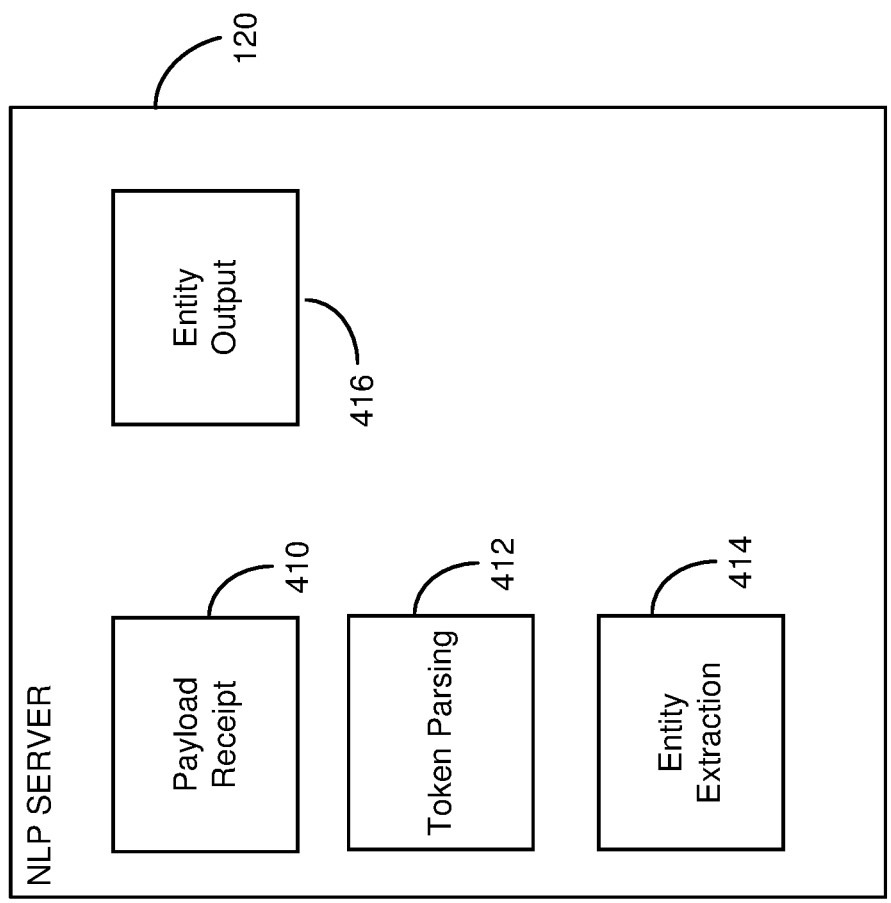
FIG. 4 is a block diagram illustrating a more detailed view of the NLP server according to one embodiment.

FIG. 4 is a block diagram illustrating a more detailed view of the NLP server 120 according to one embodiment. The NLP server 120 shown in FIG. 4 includes multiple modules. In other embodiments, the NLP server 120 may include additional, fewer, or different modules. In addition, the functionality attributed to specific modules herein may be performed by other modules in other embodiments.

A payload receipt module 410 receives message payloads from the messaging server 110. A given message payload includes normalized message content and a configuration token. The configuration token specifies the types of NLP that the NLP server 120 is to perform on the message content.

A token parsing module 412 parses tokens to determine the NLP configurations specified by the tokens. The token parsing module 412 shares configuration information with the NLP specification module 310 of the messaging server 110 which allows the token parsing module 412 to decode the meaning of the bits in configuration tokens. As mentioned earlier, a token can indicate to use a default configuration, to use a particular combination different from the default, to perform custom processing using a hook to a function, or to opt out of NLP altogether.

An entity extraction module 414 performs NLP on messages as specified by the messages' respective configuration tokens. The NLP identifies entities in the messages, where the entities represent meanings and intents conveyed by the messages. The types of entities identified by the entity extraction module 414 can differ in different embodiments and/or based on the configurations. In one default configuration, the entity extraction module 414 identifies entities including: greetings (a salutation) thanks (an expression of gratitude), bye (a valediction), date/time, amount of money, phone number, and email address.

In addition to identifying an entity, the entity extraction module 414 also produces metadata about the entity. The metadata includes a value associated with the entity and a confidence score representing the probability that the entity extraction module 414 thinks its entity recognition is correct. For example, for the amount of money entity, the entity extraction module 414 may both detect the presence of the entity (i.e., an indication that the message includes an amount of money) and the amount of money referenced in the message (i.e., the value), and produce a confidence score indicating the probability that the amount of money was correctly recognized. The confidence score is a value between zero and one, with zero indicating no confidence and one indicating complete confidence.

In addition, the entity extraction module 414 may normalize values into standard formats. For example, if the message contains the string "tomorrow at 2 PM" the entity extraction module may detect the presence of a date/time entity and represent the time in a standard format. The standard format can be an International Standards Organization (ISO) string such as "2017-05-10T14:00:00.000." The date/time entity can also be localized based on a location set in a profile for the user, e.g., the profile in the user profile store 200 of the online system 116.

An entity output module 416 outputs message responses include the identified entities and associated metadata to the messaging server 110. In one embodiment, the entity output module 416 produces a JavaScript Object Notation (JSON) structure describing the entities and associated metadata detected in a message. For example, if a received message payload includes the message "bye, see you tomorrow at 4 pm," the entity output module 416 may produce the following JSON structure:

```
{...,
  entities: {
    "datetime": [
      {
        "confidence": 0.97249440664957,
        "value": "2017-05-10T14:00:00.000-07:00",
      }
    ],
    "bye": [
      {
        "confidence": 1,
        "value": "true"
      }
    ]
  }
}
```

In this structure, the "datetime" string indicates presence of a date/time entity in the message. As shown, the confidence that the date/time entity is present is 0.97249440664957, and the value for the entity is 2017-05-10T14:00:00.000-07:00. Likewise, the "bye" string indicates the presence of a bye entity in the message. The confidence that the bye entity is present is one, and the value for the entity is "true."

Figure 5:
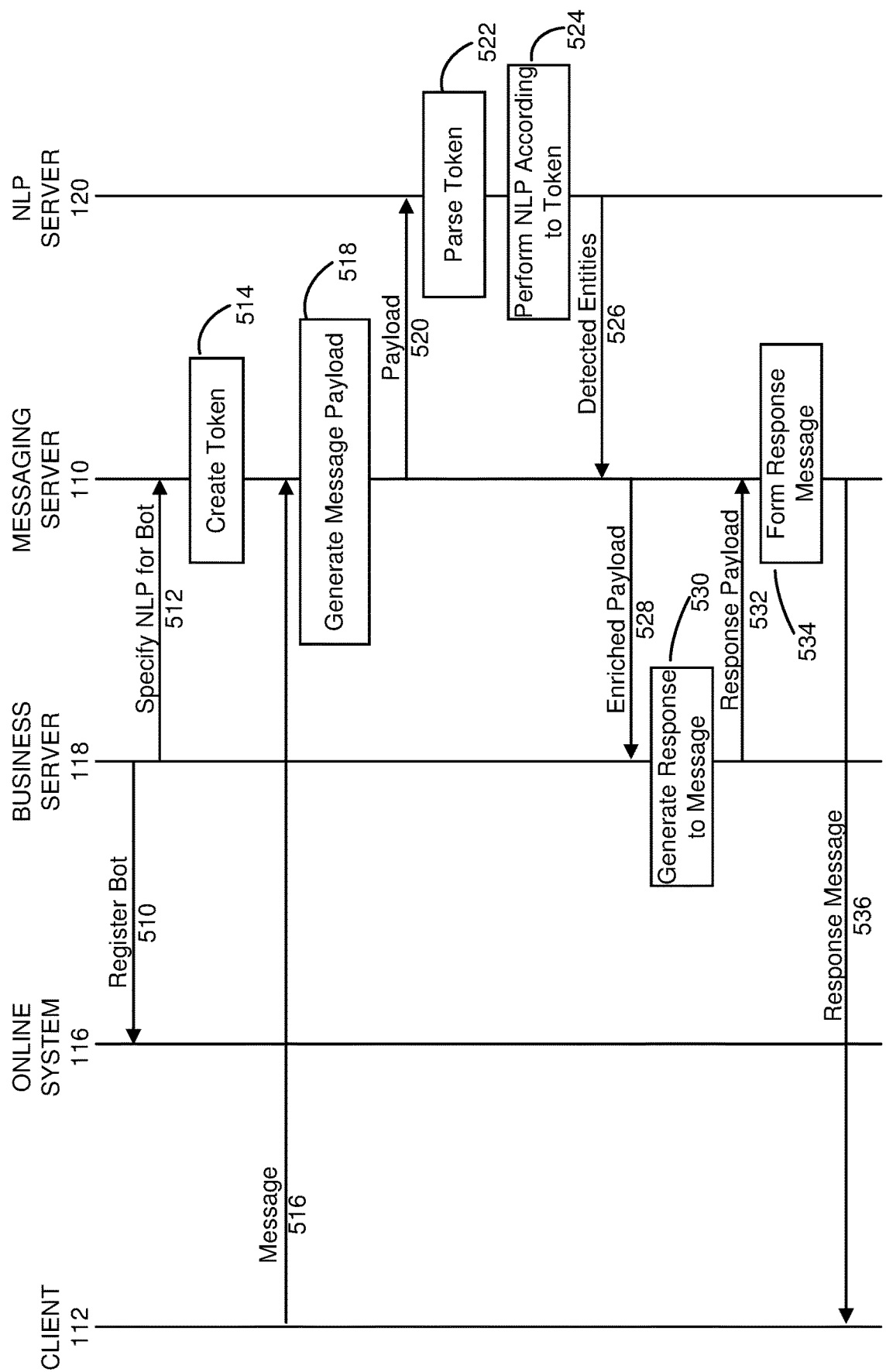
FIG. 5 is a flow diagram illustrating an example of interactions among the entities of FIG. 1 to support performing NLP on messages sent from users of clients to businesses or other recipients according to one embodiment.

FIG. 5 is a flow diagram illustrating an example of interactions among the entities of FIG. 1 to support performing NLP on messages sent from users of clients to businesses or other recipients according to one embodiment. The top of FIG. 5 illustrates a client 112 and the online system 116, business server 118, messaging server 110, and NLP server 120. An associated vertical line descends from each entity and represents the forward flow of time. Boxes on the vertical lines represent actions performed by the associated entity. Horizontal lines represent interactions between the two entities associated with the vertical lines at which the horizontal lines terminate. The actions and interactions illustrated in FIG. 5 represent one embodiment. Other embodiments can have different actions and/or interactions, and the actions and/or interactions may occur in different orders. Additionally, in other embodiments, some actions may be performed in different entities, and the interactions may involve other entities.

The example of FIG. 5 begins with an administrator of the business server 118 registering 510 a bot with the online system 116. The bot processes messages received by a page for the business in the online system 116. In addition, the administrator uses the business server 118 to interact with the messaging server 110 to specify 512 the types of NLP to perform on messages received by the specified business page/bot combination. The messaging server 110 creates 514 a configuration token describing the specified NLP configuration.

Assume the client 112 sends 516 a message to the messaging server 110. This message is directed to the business, and may have been instigated by the user of the client interacting with the business' page in the online system 116. The messaging server 110 receives the message and generates 518 a payload describing the message and including the configuration token. The messaging server 110 then sends 520 the payload to the NLP server 120.

The NLP server 120 receives the payload and parses 522 the configuration token. The NLP server 120 performs 524 NLP on the message in the payload according to the configuration specified by the token to detect a set of zero or more entities and associated metadata. The NLP server 120 sends 526 a response to the payload to the messaging server 110. The response includes the set of detected entities and associated metadata.

The messaging server 110 forms an enriched payload including the message, detected entities, and metadata and forwards 528 the enriched payload to the business server 118. The business server 118 generates 530 a response to the client message. For example, the business server 118 may process the enriched payload using the messaging bot to produce the response. The business server 118 sends 532 a response payload including the response to the messaging server 110. The messaging server 110 forms 534 a response message from the response payload and forwards 536 the response message to the client 112. While the descriptions and examples provided above refer to messages in the English language, embodiments of the entities described in FIG. 5 can support multiple languages.

Figure 6:
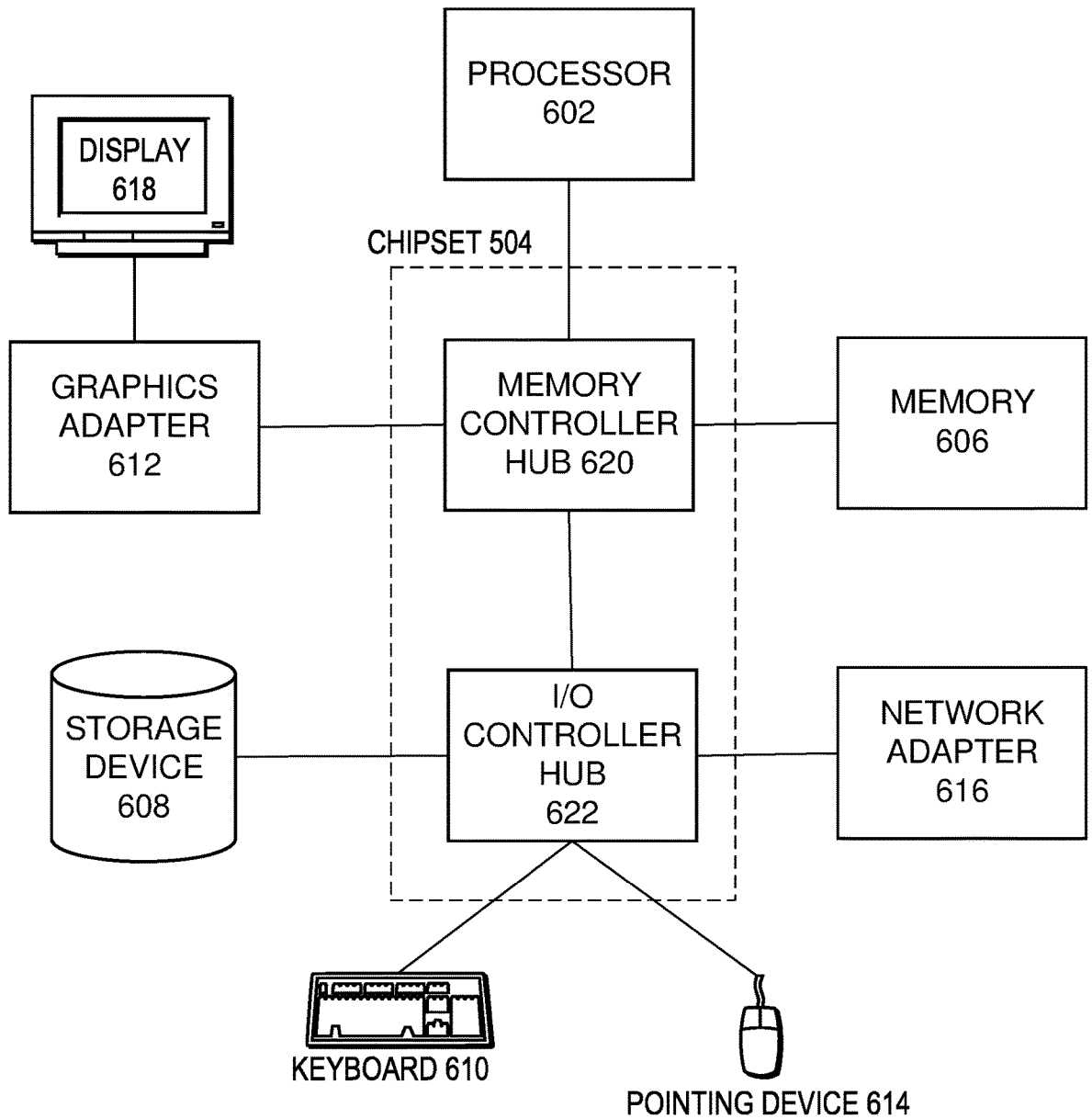
FIG. 6 is a high-level block diagram illustrating physical components of a computer used as part or all of one or more of the entities described herein in one embodiment.

FIG. 6 is a high-level block diagram illustrating physical components of a computer 600 used as part or all of one or more of the entities described herein in one embodiment. For example, instances of the illustrated computer 600 may be used as a the messaging server 110. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O hub 622. In another embodiment, the memory 606 is coupled directly to the processor 602 instead of the chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer 600. The graphics adapter 612 displays images and other information on the display 618. The network adapter 616 couples the computer system 600 to a local or wide area network.

As is known in the art, a computer 600 can have different and/or other components than those shown in FIG. 6. In addition, the computer 600 can lack certain illustrated components. In one embodiment, a computer 600 acting as a server may lack a keyboard 610, pointing device 614, graphics adapter 612, and/or display 618. Moreover, the storage device 608 can be local and/or remote from the computer 600 (such as embodied within a storage area network (SAN)).

As is known in the art, the computer 600 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 608, loaded into the memory 606, and executed by the processor 602.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    receiving a message having message content and sent by a client to a recipient;
    determining, from the received message, a page in an online system and a messaging bot associated with the message;
    retrieving a configuration token from a repository responsive to the determined page and messaging bot;
    providing a message payload including the message content and the configuration token to a NLP server, the configuration token specifying natural language processing (NLP) to perform on the message content;
    receiving a response to the message payload from the NLP server, the response including a set of entities detected in the message content responsive to the NLP specified by the configuration token; and
    providing an enriched payload including the message content and the response to the message payload to the messaging bot.

2. The method of claim 1, further comprising:
    receiving, from the recipient, registration of the messaging bot to process messages sent to the recipient;
    receiving a specification of NLP processing to perform on message content in messages sent to the messaging bot; and
    creating the configuration token responsive to the received specification of NLP processing.

3. The method of claim 1, further comprising:
    receiving a response payload from the recipient, the recipient having generated the response payload responsive to receiving the enriched payload;
    forming a response message based on the response payload; and
    forwarding the response message to the client.

4. The method of claim 1, further comprising:
    normalizing the message content; and
    forming the message payload using the normalized message content and the retrieved configuration token.

5. The method of claim 1, wherein the NLP server is adapted to parse the configuration token to determine a NLP configuration specifying the NLP to perform on the message content and to perform the NLP to detect the set of entities in the message content.

6. The method of claim 1, wherein the response received from the NLP server comprises the set of entities detected in the message content and metadata describing the entities, and wherein the enriched payload provided to the recipient includes the set of entities and the metadata.

7. A non-transitory computer-readable medium storing computer program instructions executable by a processor to perform operations comprising:
    receiving a message having message content and sent by a client to a recipient;
    determining, from the received message, a page in an online system and a messaging bot associated with the message;
    retrieving a configuration token from a repository responsive to the determined page and messaging bot;
    providing a message payload including the message content and the configuration token to a NLP server, the configuration token specifying natural language processing (NLP) to perform on the message content;
    receiving a response to the message payload from the NLP server, the response including a set of entities detected in the message content responsive to the NLP specified by the configuration token; and
    providing an enriched payload including the message content and the response to the message payload to the messaging bot.

8. The computer-readable medium of claim 7, the operations further comprising:
    receiving, from the recipient, registration of the messaging bot to process messages sent to the recipient;

receiving a specification of NLP processing to perform on message content in messages sent to the messaging bot; and creating the configuration token responsive to the received specification of NLP processing.

9. The computer-readable medium of claim 7, the operations further comprising:

receiving a response payload from the recipient, the recipient having generated the response payload responsive to receiving the enriched payload;

forming a response message based on the response payload; and forwarding the response message to the client.

10. The computer-readable medium of claim 7, the operations further comprising:

normalizing the message content; and forming the message payload using the normalized message content and the retrieved configuration token.

11. The computer-readable medium of claim 7, wherein the NLP server is adapted to parse the configuration token to determine a NLP configuration specifying the NLP to perform on the message content and to perform the NLP to detect the set of entities in the message content.

12. The computer-readable medium of claim 7, wherein the response received from the NLP server comprises the set of entities detected in the message content and metadata describing the entities, and wherein the enriched payload provided to the recipient includes the set of entities and the metadata.

13. A computer system comprising:

a computer processor adapted to execute computer program instructions; and a non-transitory computer-readable storage medium storing computer program instructions executable by the processor to perform operations comprising:

receiving a message having message content and sent by a client to a recipient;

determining, from the received message, a page in an online system and a messaging bot associated with the message;

retrieving a configuration token from a repository responsive to the determined page and messaging bot;

providing a message payload including the message content and the configuration token to a NLP server, the configuration token specifying natural language processing (NLP) to perform on the message content;

receiving a response to the message payload from the NLP server, the response including a set of entities detected in the message content responsive to the NLP specified by the configuration token; and providing an enriched payload including the message content and the response to the message payload to the messaging bot.

14. The computer system of claim 13, the operations further comprising:

receiving, from the recipient, registration of the messaging bot to process messages sent to the recipient;

receiving a specification of NLP processing to perform on message content in messages sent to the messaging bot; and creating the configuration token responsive to the received specification of NLP processing.

15. The computer system of claim 13, the operations further comprising:

receiving a response payload from the recipient, the recipient having generated the response payload responsive to receiving the enriched payload;

forming a response message based on the response payload; and forwarding the response message to the client.

16. The computer system of claim 13, the operations further comprising:

normalizing the message content; and forming the message payload using the normalized message content and the retrieved configuration token.

17. The computer system of claim 13, wherein the NLP server is adapted to parse the configuration token to determine a NLP configuration specifying the NLP to perform on the message content and to perform the NLP to detect the set of entities in the message content.

* * * * *